Aug. 19, 1952 — G. B. HILL — 2,607,182
SIDE RAKE SPRING TOOTH
Filed June 10, 1950
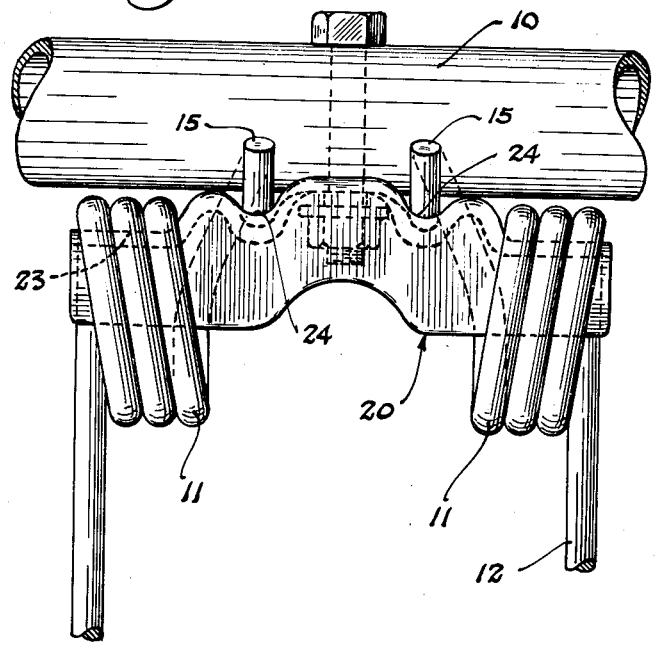
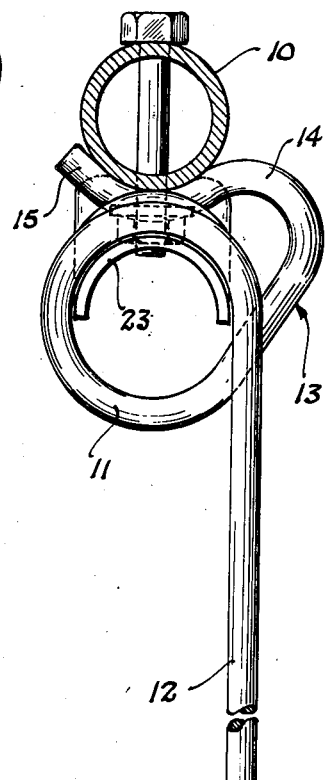
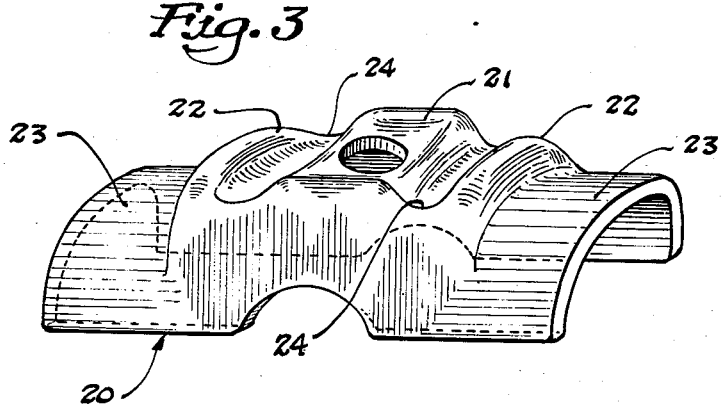
Inventor
George B. Hill
By Allan R. Redrow
Attorney Patented Aug. 19, 1952

2,607,182

UNITED STATES PATENT OFFICE 2,607,182

SIDE RAKE SPRING TOOTH

George B. Hill, New Holland, Pa., assignor to The New Holland Machine Division of The Sperry Corporation, New Holland, Pa., a corporation of Delaware Application June 10, 1950, Serial No. 167,287

7 Claims. (Cl. 56—400)

This invention relates to a resilient form of raking tooth and more particularly to such a spring tooth and mounting means as are especially designed for use on a structure such as the rake bars of the rotating reel of a side delivery rake.

The conventional form of a driven side delivery raking machine makes use of a rotating reel that has several rake bars upon which a number of spring teeth are carried in a manner to be driven over the field to engage the hay whereby to sweep it into a windrow. The improved tooth structure here shown is adapted to cooperate with its mounting on the raking bar of the reel in such a way as to minimize wear on the tooth due to the constant flexing to which it is subjected in use, and it has been provided in order to simplify the tooth and its cooperating mounting structure.

The side rake tooth structure here shown embodies a simple shape or design that is mounted in a way as to always be resiliently urged into a firm engagement with its mounting whereby each of the fingers are held firmly yet yieldingly in position, and which also prevents rattles. The mounting means includes a support for the spring coil to position the teeth relative to the rake bar, and the raking fingers all extend downwardly in the same direction from their respective mounting means. Each tooth has a stub end extending outwardly from the coil, and which is looped back upon itself to resiliently engage the rake bar in a manner to press the tooth firmly against the mounting means.

The preferred form of this tooth structure is shown in drawings wherein:

Figure 1 is an elevation of a portion of a raking bar as if looking forwardly toward the bar from the rear end of a side delivery rake;

Figure 2 is an end view of the structure shown in Figure 1; and

Figure 3 is a perspective of the clip or mounting means for holding two complementary teeth on the raking bar.

As represented in the drawings, the raking bar 10 is adapted to be carried in the rotating reel of a conventional side delivery rake, the structure and operation of which are well understood in the art. The resilient raking tooth means of such a machine, is adapted to be carried on the underside of the rake bar and in position to engage the crop as the bar rotates in timed sequence with the rotation of the reel. The several teeth engage the hay or the like to lift it from the field, and in cooperation with the strippers and other portions of rake structure not shown, either forms the hay into windrows or teds the hay for completing the curing process.

Each of the improved tooth structures forming the subject of this invention includes a coil 11, a downwardly projecting rake tooth 12, and a generally upwardly projecting stub end 13. The stub end has a length to project outwardly from the coil, as is best shown in Figure 2, and is provided with a bend 14 whereby it is turned back upon itself and it is shaped as at 15 to snugly fit under the raking bar when the tooth is mounted under the raking bar.

Complementary right and left hand tooth means are provided, as shown in Figure 1, and both teeth are mounted on the opposite sides of the support clip 20, the shape of which is best shown in Figure 3. The clip is removably fastened rigidly onto the underside of the raking bar as by being bolted thereto, and the saddle 21 holds the clip solidly in alignment with the bar while the ridge elements 22 serve to further brace the clip as one side or the other may become loaded in normal usage of the rake. The clip has a pair of support wings 23 formed integral therewith, and as is clearly shown in the drawings, the wings are adapted to fit within and support the coil sections of the two teeth.

When the coils are placed on the wings, the shaped ends 15 of the stub ends of each of the tooth means, are fitted into the valleys 24 formed between each side of the saddle 21 and the ridges 22. The valleys 24 are adapted to fit the stub ends snugly and hold each of these portions of the tooth means firmly seated against the bottom of the raking bar. In this connection, it should be noted that in forming the individual tooth elements, the stub ends 13 are so shaped that the shaped ends 15 are spaced somewhat from the coils so that when the tooth is placed on a clip and the clip is drawn tight against the rake bar, the stub ends and coil sections are compressed together and are thus somewhat stressed in a manner to hold the teeth tightly mounted between the mounting means and raking bar.

Once a plurality of the complementary tooth structures of this invention are assembled on the raking bars of a side delivery rake, the machine is ready for operation in the normal manner. The rake may be used for either windrowing or tedding a crop and no matter how the reel is rotated, the individual tooth elements are firmly engaged against the raking bar.

When the machine is used for raking, the rake bar moves in the direction of the arrow in Figure 2. The tooth 12 is then bent backwardly around the wing 23 as it is loaded and the shaped end 15 of the stub arm 13 is urged in a direction to bear more firmly against the raking bar. When the loading of tooth 12 is reversed as in tedding, the upwardly turned loop portion 14 is urged in a direction to press more firmly against the raking bar. Thus the structure is perfectly adapted for all uses to which the conventional side rake may be put.

In completing the assembly of the rake teeth on the raking bars, it is apparent that because the center point for the radius of the shaped portion 15 of the stub end is aligned with the center point for the radius of the coil, that the raking teeth 12 mounted under each rake bar are always maintained generally in the same plane when the clips 20 are drawn up tight against the raking bars. The shaped portions 15 nest snugly around the bars, and when the coils are lifted up by the clips, the teeth means are uniformly stressed and positioned with respect to each of their respective rake bars.

The simplified tooth structure here shown, may be readily replaced whenever an individual tooth element breaks during usage, and because the individual teeth may be replaced, the expense of replacement is kept to a minimum. The structure is so supported with respect to the raking bar, however, that the maximum desired flexibility can be had without any looseness or undue stressing of any portions of the individual tooth elements.

The preferred form of the invention is shown in the drawings, but it is apparent that modifications thereof may occur to those skilled in the art which will fall within the scope of the following claims.

I claim:

1. The combination with a cylindrical raking bar of a clamp element secured to said raking bar having a medial saddle conformingly seated against the periphery of said bar and raised ridges spaced from the saddle on opposite sides thereof to define valleys extending across said element transversely to the raking bar, said element being provided with integral supporting wings at its opposite ends parallel to the raking bar, spring coils axially receiving and supported on said respective wings, a raking finger extending outwardly from one end of each said spring coil, a spring arm extending outwardly from the other end of each said spring coil, each said arm being reversely bent on itself with its free end disposed in one of said valleys between said clamp element and said bar and resiliently deflected by the bar toward said clamp element to thus resiliently thrust its respective coil against the supporting wing for same.

2. The combination with a cylindrical rake bar of a clamp element secured to said rake bar having a raised saddle conformingly seated against said bar and a ridge spaced from the saddle in a direction lengthwise of the bar to define a valley between said saddle and said ridge, a supporting wing extending from said element parallel to the rake bar and spaced therefrom, a spring coil axially receiving and supported on said wing, a raking finger extending outwardly from one end of said coil, a spring arm extending outwardly from the other end of said coil, said arm being reversely bent on itself with its free end disposed in said valley between said clamp element and said bar and resiliently deflected by the bar toward said clamp element to thus resiliently thrust its coil against the supporting wing for same.

3. The combination with a cylindrical rake bar of a clamp element secured to said rake bar having a raised saddle conformingly seated against said bar and a ridge spaced from the saddle in a direction lengthwise of the bar to define a valley between said saddle and said ridge, a supporting wing extending from said element parallel to the rake bar and spaced therefrom, a spring coil axially receiving and supported on said wing, a raking finger extending outwardly from one end of said coil, a spring arm extending outwardly from the other end of said coil, said arm being disposed in said valley between said clamp element and said bar to prevent axial movement of the coil on said supporting wing.

4. The combination defined in claim 2, in which the free end of the said spring arm is formed with a curved portion seating against and extending on opposite sides of the rake bar to thus prevent bodily rotary movement of the spring coil around its supporting wing.

5. The combination with a cylindrical raking bar of a clamp element secured to said raking bar having a saddle conformingly seating against said bar and a supporting wing carried by said element in spaced parallel relation to the bar, a spring coil axially receiving and supported on said wing, a raking finger extending outwardly from one end of said spring coil, a spring arm extending outwardly from the other end of said spring coil, said arm being reversely bent on itself with its free end portion disposed between said clamp element and the bar and resiliently deflected by the bar toward the clamp element to thus resiliently thrust the coil against its supporting wing.

6. The combination with a raking bar of a clamp element secured to said raking bar having a supporting wing in spaced parallel relation to the bar, a spring coil axially receiving and supported on said wing, a raking finger extending outwardly from one end of said spring coil, a spring arm extending outwardly from the other end of said spring coil, said arm being reversely bent on itself with its free end portion disposed between said clamp element and the bar and resiliently deflected by the bar toward the clamp element to thus resiliently thrust the coil against its supporting wing.

7. The combination with a raking bar of a clamp element secured to said raking bar having a supporting wing in spaced parallel relation to the bar, a spring coil axially receiving and supported on said wing, a raking finger extending outwardly from said spring coil, a spring arm extending outwardly from said spring coil, said arm being disposed between said clamp element and the bar and resiliently deflected by the bar toward the clamp element to thus resiliently thrust the coil against its supporting wing.

GEORGE B. HILL.

REFERENCES CITED

The following references are of record in the file of this patent:

UNITED STATES PATENTS

| Number | Name | Date |
|---|---|---|
| 171,790 | Galt | Jan. 4, 1876 |
| 2,432,653 | Bloom | Dec. 16, 1947 |
| 2,482,883 | Thomas | Sept. 27, 1949 |

FOREIGN PATENTS

| Number | Country | Date |
|---|---|---|
| 106,985 | Great Britain | June 14, 1917 |